United States Patent [19]

Tracy et al.

[11] Patent Number: 4,645,308

[45] Date of Patent: Feb. 24, 1987

[54] LOW VOLTAGE SOLID-STATE LATERAL COLORATION ELECTROCHROMIC DEVICE

[75] Inventors: C. Edwin Tracy; David K. Benson, both of Golden; Marta R. Ruth, Boulder, all of Colo.

[73] Assignee: The United States of America as represented by the Department of Energy, Washington, D.C.

[21] Appl. No.: 685,177

[22] Filed: Dec. 21, 1984

[51] Int. Cl.⁴ ................................................ G02F 1/01
[52] U.S. Cl. .................................................... 350/357
[58] Field of Search ......................................... 350/357

[56] References Cited

U.S. PATENT DOCUMENTS 4,253,742  3/1981  Morita ................................. 350/357

Primary Examiner—Bruce Y. Arnold
Attorney, Agent, or Firm—Kenneth L. Richardson; John M. Albrecht; Judson R. Hightower

[57] ABSTRACT

A solid-state transition metal oxide device comprising a plurality of layers having a predisposed orientation including an electrochromic oxide layer. Conductive material including anode and cathode contacts is secured to the device. Coloration is actuated within the electrochromic oxide layer after the application of a predetermined potential between the contacts. The coloration action is adapted to sweep or dynamically extend across the length of the electrochromic oxide layer.

13 Claims, 4 Drawing Figures

LOW VOLTAGE SOLID-STATE LATERAL COLORATION ELECTROCHROMIC DEVICE

CONTRACTUAL ORIGIN OF THE INVENTION

The United States Government has rights in this invention pursuant to Contract No. DE-AC02-83CH10093 between the United States Department of Energy and the Solar Energy Research Institute, a Division of the Midwest Research Institute.

BACKGROUND OF THE INVENTION

1. Field of the Invention

The present invention relates to the coloration of solid-state electrochromic oxide devices.

2. Description of the Prior Art

Electrochromism is the property of a material or system to change color or form color centers reversibly in response to an applied potential. Electrochromism occurs when a material exhibits an intense color change when subjected to an electric field of sufficient strength. The intensity of coloration is proportional to the applied field and the length of exposure.

Several theories have been advanced to explain the solid-state electrochromism phenomenon in transition metal oxides. The effect was originally thought to result from electrons injected into the metal oxide and trapped at oxygen vacancies or similar defect centers. Others interpreted the coloration action as an electrochemical extraction of oxygen with the colored product being stoichiometric. Still others proposed that coloration is brought about not by insertion of hydrogen atoms, but by redistribution of already incorporated hydrogen atoms from optically inactive sites to optically active sites within the transition metal oxide film. The most commonly accepted explanation for the electrochromic effect in transition metal oxides appears to be the simultaneous injection of electrons and protons, or positive monovalent ions such as $Li^+$, $Na^+$, and the like, into the material which forms a blue hydrogenated bronze.

It is generally recognized that there are a number of metal oxides which display cathodic coloration, i.e., coloration which commences at the cathode terminal of the device. Following is a partial listing of the materials known to display this phenomenon upon the application of an electric field.

(A) $WO_3$
(B) $MoO_3$
(C) $WO_3/MoO_3$
(D) $V_2O_5$
(E) $Nb_2O_5$
(F) $TiO_2$
(G) $W_9Nb_8O_{47}$
(H) $WO_3/ReO_3$
(I) $WO_3/Au$

While each of the oxides listed above displays cathodic coloration, tungsten trioxide ($WO_3$) is known to have optical and electrical properties that are best suited for the fabrication of thin film devices. The physical properties of this material have been extensively studied in recent years due to its ferroelectric characteristics and its unusual ability to form tungsten bronzes when positive monovalent ions are incorporated into its lattice.

Electrochromic behavior of an evaporated $WO_3$ thin film was first observed in an arrangement of two closely spaced metal terminals secured to a film. Blue coloration was generated adjacent to the cathode which migrated laterally toward the anode under an applied field of about $1 \times 10^4$ V/cm. The value of the field intensity required to actuate coloration in devices of the relevant type is known to limit the interelectrode coloration distance to only a few millimeters. Consequently, the application of a voltage for about 0.5 to 2.5 hours is required to complete the coloration process.

In view of these considerations, researchers have focused on a planar version of the electrochromic device described above, i.e., a device which has a plurality of layers. It is generally recognized that lower voltages are required to actuate coloration in devices of planar configuration. However, in such configurations, coloration occurs perpendicularly through the transition metal oxide layer and is particularly sensitive to fabrication and thin film deposition conditions. That being the case, pinholes, defects, and morphological irregularities introduced during the fabrication process lead to parasitic currents which often reduce the efficiency of coloration and the electro-optic reproducibility of the device.

SUMMARY OF THE INVENTION

It is the primary object of the present invention to provide a new and improved solid-state transition metal oxide device.

It is another object of the present invention to provide a new and improved solid-state transition metal oxide device adapted to produce lateral coloration.

A further object of the present invention is to provide a new and improved solid-state electrochromic oxide device requiring low voltage to actuate the coloration process.

An additional object of the present invention is to provide a new and improved solid-state electrochromic oxide device with substantially improved coloration rates.

It is still another object of the present invention to provide a new and improved solid-state electrochromic oxide device in which lateral coloration is induced over a large distance by low voltage.

It is still a further object of the present invention to provide a new and improved solid-state electrochromic oxide device which is substantially independent of interelectrode spacing.

It is still an additional object of the present invention to provide a new and improved solid-state electrochromic oxide device having dark blue coloration.

Yet another object of the present invention is to provide a new and improved solid-state electrochromic oxide device which is substantially unaffected by defects during its fabrication.

To achieve the foregoing and other objects and in accordance with the purposes of the present invention as embodied and broadly described herein, the structure to which the inventive concept is applied in one examle comprises a thin film solid-state transition metal oxide device having a plurality of layers including an electrochromic oxide layer. The device is adapted to color laterally along a selected path pursuant to the application of a predetermined voltage between the cathode and anode contacts. The voltage applied to the device is adapted to induce a current and therefore an electric field about the electrochromic oxide layer. The coloration action is precisely actuated by the electric field precipitated by the current within the device.

The structure of the preferred device specifically comprises a top layer of conductive material including an anode contact affixed to a layer of dielectric material. A layer of electrochromic oxide material is secured to the dielectric material and to a cathode contact. The device lastly comprises a substrate attached to the conductive, dielectric, and to the layer of electrochromic oxide material.

Additional objects, advantages, and novel features of the invention shall be set forth in part in the description that follows, and will become apparent to those skilled in the art upon examination of the following specification or may be learned by the practice of the invention. The objects and the advantages of the invention may be realized and attained by means of the instrumentalities and in combinations particularly pointed out in the appended claims.

BRIEF DESCRIPTION OF THE DRAWINGS

The accompanying drawings, which are incorporated in and form a part of the specification, illustrate the present invention and together with the description serve to explain the principles of the invention.

In the drawings.

DETAILED DESCRIPTION OF THE PREFERRED EMBODIMENTS

Figure 1:
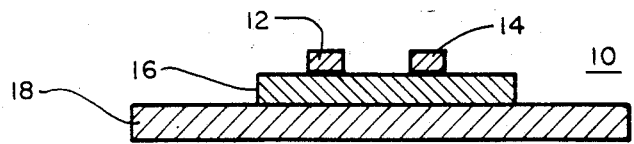
FIG. 1 is a cross-sectional view of a prior art solid-state lateral coloration device.

FIG. 1 illustrates a prior art lateral coloration device 10 comprising anode and cathode contacts or terminals 12 and 14, respectively. The cathode and anode are both secured to a layer of $WO_3$ material 16 which itself is affixed to a glass substrate 18. Blue coloration is actuated within layer 16 pursuant to the application of a definite voltage between terminals 12 and 14. The coloration action commences in the $WO_3$ material below cathode 14 and translates in the direction of anode 12 under the influence of the electric field so long as the voltage is applied to the terminals. It has been established that a relatively high electric field strength is required to complete the coloration process in device 10.

Figure 2:
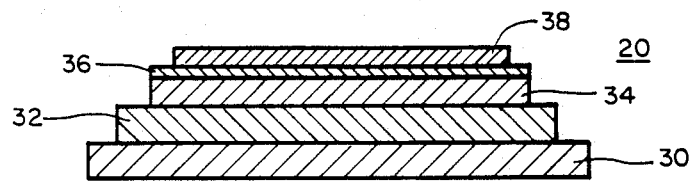
FIG. 2 is a cross-sectional view of a planar prior art solid-state coloration device.

A planar oriented prior art device 20 is disclosed in FIG. 2. Device 20, like device 10 illustrated in FIG. 1 has several layers including a substrate 30 upon which is secured a second conductive layer 32. Disposed between layer 32 and a first conductive layer 38 is an insulative layer 36 and a $WO_3$ layer of material 34, the latter being attached to second conductive layer 32. In this device, the anode and cathode contacts consist of layers 38 and 32. A voltage applied between the contacts actuates the coloration process in a manner similar to that described above. However, in device 20, the coloration action travels perpendicularly through $WO_3$ layer 34 as current flows from the cathode to the anode.

Figure 3:
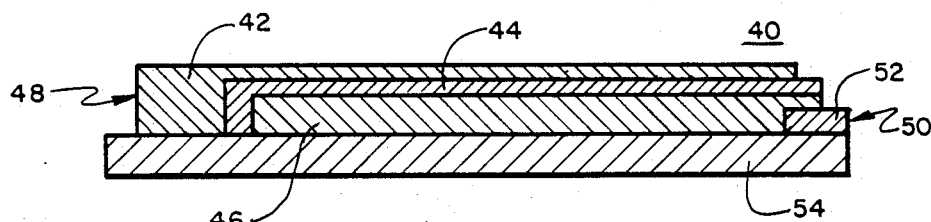
FIG. 3 is a cross-sectional view of the preferred embodiment of the solid-state transition metal oxide device in accordance with the present invention.

The preferred embodiment of the transition metal oxide device 40 is illustrated in FIG. 3. The orientation of device 40 consists of a layer of dielectric or insulative material 44 to which is affixed a top layer of conductive material 42. A layer of electrochromic oxide material 46 is additionally secured to insulative material 44 and to a cathode contact 52. In the present invention, the conductive layer 42 consists of the anode contact. The top conductive, dielectric, and electrochromic layers 42, 44, ane 46, respectively, are all lastly attached to a substrate 54. Although the contacts of the preferred embodiment are intimately attached to device 40, it will be understood that they are not limited to any particular figuration. The anode and cathode of the present device has an "origin" depicted in FIG. 3 by arrows 48 and 50, respectively. A voltage source (not shown) is applied across the contacts of device 40 in order to actuate coloration.

The conductive material, including the terminals, can consist of any of a number of ductile conducting materials known to have good electrical properties such as gold (Au), silver (Ag), copper (Cu), or the like. Additionally, transparent oxide semiconductors such as $SnO_2$ or $In_2O_3:SnO_2$ are also known to be highly conductive and are easily shaped or molded. The thickness of the conductive layers of the preferred device should fall within the range of 100 angstroms to 20 micrometers depending upon whether the device is intended for transmissive or reflective application. In this connection, the thickness of this layer of material is estimated to add only a small amount of resistance to device 40. Additionally, the resistivity of the conductive material should be less than $1 \times 10^{-2}$ ohm-centimeter (cm) to facilitate the flow of current within the preferred device.

The dielectric or insulative material employed in the present invention can be an electrically nonconducting material having a resistivity of at least $1 \times 10^9$ ohm-cm such as $MgF_2$, $SiO$, $TiO_2$, or the like. Electronically insulating fast-ion conductors, such as $RbAg_4$ or hydronium-beta alumina, also satisfy the resistivity requirements of the present invention. The thickness of the dielectric material should lie within the range of 200 angstroms to 2 micrometers and should preferably be 1/30 to ½ the thickness of the adjacent electrochromic oxide layer.

As discussed above, the electrochromic oxide material may consist of a number of oxides that display cathodic coloration. The electrochromic material can also embody oxides that color anodically, i.e., coloration commencing at the positively charged electrode, such as $Ir_2O_3$, $Rh_2O_3$, or even others. However, whenever an anodic electrochromic oxide material is employed, the polarity of the applied field must be reversed to properly actuate the coloration action. This reversal is achieved by simply switching the polarity of the voltage applied to the terminals. As in the case of the conductive and dielectric layers, the thickness of the electrochromic layer should preferably lie between 200 angstroms to 20 micrometers depending upon the application.

The substrate material of device 40 is preferably soda lime silicate and borosilicate glass, but other materials such as plastics, e.g., plexiglass, mylar, or the like, easily fall within the scope of the present invention. As observed, the substrate is not actively involved in the operation of the device. To this end it should be a durable material with nonconducting properties. The thickness of the substrate should be adequate to support the device and maintain its integrity.

The operation of device 40 is closely tied to the resistivity of the several layers of material. Under normal conditions, the resistivity of the electrochromic oxide material, about $1\times10^8$ ohm-cm, is high by comparison to the resistivity of the conductive material. In this regard, the electrochemical oxide material functions as an insulator which otherwise restricts the flow of current within device 40. Moreover, the resistivity of the dielectric material, typically about $1\times10^{14}$ ohm-cm, is much larger than the resistivity of the electrochromic material.

When the preferred voltage, i.e., about 20 volts, is applied between the origin of the contacts, the edge of the electrochromic layer in the vicinity of the cathode begins to color blue or effectively undergoes blue coloration. It is generally understood by those skilled in the art that the actuation of blue coloration in electrochromic oxide thin films is accompanied by a large increase in electronic conductivity. An increase in conductivity implies that the resistivity of the material has been diminished. It is estimated that because of blue coloration in the electrochromic oxide layer the resistivity thereof decreases to about $1\times10^3$ ohm-cm.

Since the resistivity of the dielectric layer is high by comparison to the resistivity of the conductive and the electrochromic oxide layers, the anode is essentially isolated from the cathode because of the highly resistive path to the flow of current. Therefore, current is restricted within the electrochromic oxide layer when the latter is colored and therefore conductive. In FIG. 3, the flow of current commences at the origin of the cathode and travels laterally through the self-generating and growing coloration front of the electrochromic oxide layer, then perpendicularly through the dielectric layer at the boundary of the coloration front, and laterally again through the top conductive layer of material to the origin of the anode.

In other words, the lateral coloration action is evident because of a dynamic extension phenomenon of the cathode contact. This phenomenon results from the ability of the electrochromic oxide material to lower its resistivity through the reordering of its electronic states by electronic/ionic charge injection at the contacts. Therefore, the blue electrochromic oxide layer literally becomes a self-generating conductive front which sweeps laterally toward the origin of the anode.

Figure 4:
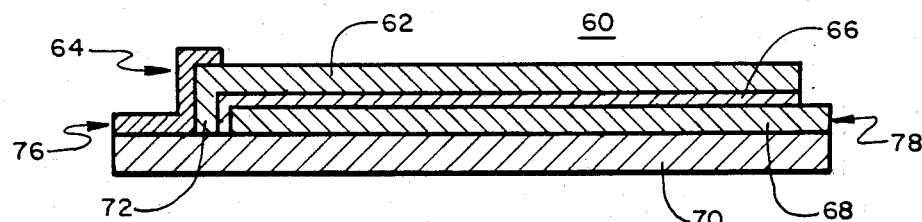
FIG. 4 is a cross-sectional view of another embodiment of the solid-state transition metal oxide device in accordance with the present invention.

FIG. 4 is a second embodiment of the present invention, also displaying cathodic coloration when the proper voltage is applied between the contacts. An electrochromic oxide layer of material 62 is affixed to a dielectric layer 66. One end of a cathode 64 is secured to the electrochromic oxide layer 62. A substrate 70 is attached to the other end of cathode 64 and to electrochromic oxide layer 62 through an extension 72. An anode 68 of elongate configuration is disposed between dielectric material 66 and substrate 70. Arrows 76 and 78 represent the "origin" of cathode 64 and anode 68, respectively, between which the proper voltage is applied.

The application of a predisposed voltage of about 20 volts to the device illustrated in FIG. 4 colors the section of electrochromic oxide layer 62 which is oriented between the top portion of cathode 64 and dielectric layer 66. As in the case of device 40 illustrated in FIG. 3, the coloration action reflects the dynamic extension of cathode 64 as it sweeps toward the origin of the anode because of the influence of the electric field.

The devices of the present invention were fabricated by sequentially evaporating $WO_3$, $MgF_2$, and Au layers onto an indium tin oxide (ITO) coated glass substrate held at room temperature. The ITO coated substrate was etched in dilute HCL acid to foster the desired contact with the Au and $WO_3$ layers. Prior to thin film evaporation, the cleaning procedure employed on the substrate consisted of a mild detergent scrub, a deionized water rinse, and a final rinse in high purity ethanol. Source materials for evaporation included 99.9% $WO_3$ powder manufactured by Fluka Chemical Corporation, 99.99% $MgF_2$ pellets and 99.99% Au wire purchased from Alfa Products Company.

A typical deposition sequence included the following steps: (a) the substrate was loaded onto a mask/holder platen and evacuated to a base pressure of about $2\times10^{-6}$ torr (a torr is a unit of pressure that is equal to $1.316\times10^{-6}$ atmosphere); (b) oxygen gas was admitted into the chamber and a thin film of $WO_3$ was evaporated onto the substrate at a pressure of approximately $2\times10^{-4}$ torr; (c) the system was reevacuated to about $1\times10^5$ torr and a thin film of $MgF_2$ was evaporated onto the substrate through the same masking arrangement; (d) the system was brought up to atmosphere, and the specimens were loaded into a second mask/holder platen, and (e) the system was reevacuated to about $8\times10^{-6}$ torr for the subsequent deposition of a semitransparent Au layer of film.

The invention can be further illustrated in the nonlimiting examples that follow. In examples 1 and 2, a potential is applied to the device to actuate the coloration action. Examples 3 and 4 disclose information and data available in the art.

EXAMPLE 1

The configuration of this device (FIG. 3) comprised an Au layer whose thickness was about 150 angstroms, a $MgF_2$ layer of about 1700 angstroms, a $WO_3$ layer of 4100 angstroms, and an ITO layer of about 5200 angstroms with a resistivity of about 10 ohm-cm. The thickness of the substrate was ⅛ inch, and it was composed of soda lime silicate glass. Subsequent to the application of 12 volts between the origin of the contacts, blue coloration was noticed within the $WO_3$ layer near the cathode. The coloration front proceeded to the left with respect to FIG. 3, i.e., toward the anode. After a 17 minute coloration time in which 12 volts and 74 milliamps were applied to the device, the length of coloration was noted to be 16 mm. After a 22 minute coloration time at the same voltage, the total perceived length of coloration was 19.5 mm. The rate of coloration for the $WO_3$ layer of this device was 0.885 mm/minute.

EXAMPLE 2

An alternate configuration of the device disclosed in example 1 comprised an Au layer of about 135 angstroms thick, a $MgF_2$ layer of 1500 angstroms, a $WO_3$ layer whose thickness was about 3000 angstroms, and an ITO layer approximately 5200 angstroms thick. The size and type of substrate was identical to that disclosed in example 1. In this example, 21 volts was applied between the origin of the contacts, and the current was approximately 57 milliamps. A 19 mm length of coloration was observed over a 14 minute coloration time. The coloration started at the cathode and progressed toward the anode. For this device the rate of coloration was found to be 1.395 mm/minute.

EXAMPLE 3

This prior art device (FIG. 1) included a $WO_3$ layer whose thickness was about 10,000 angstroms. In addition, the Au contacts were separated by about 1.0 mm. The potential applied across the contacts was about 1300 volts, and the induced electric field was about 10,000 volts/cm. The length of coloration was nearly 1.3 mm over a 2.5 hour coloration time. The rate of coloration was approximatey at 0.007 mm/minute for this device.

EXAMPLE 4

This prior art device embraced a $WO_3$ layer whose thickness was about 10,000 angstroms with substantially the same distance between the terminals. The potential applied between the contacts was about 1000 volts. The electric field created between the contacts was on the order of 10,000 volts/cm. Subsequent to the application of the referenced voltage, the length of coloration was nearly 1.0 mm over a coloration time of 0.5 hours. The rate of coloration was 0.03 mm/minute.

The following tabulation illustrates the results of the four examples. In each example, the electrochromic oxide material consisted of $WO_3$.

| Example | 1 | 2 | 3 | 4 |
|---|---|---|---|---|
| Voltage (V) | 12 | 21 | 1,300 | 1,000 |
| Electric Field (v/cm) | N/A | N/A | $1 \times 10^5$ | $1 \times 10^5$ |
| Length of Coloration (mm) | 19.5 | 19.0 | 1.30 | 1.0 |
| Rate of Coloration (mm/min) | 0.89 | 1.38 | 0.007 | 0.03 |
| Coloration Time (minutes) | 22 | 14 | 150 | 30 |

In view of this data, it is evident that the length and rate of coloration is enhanced whereas the coloration time is decreased in examples 1 and 2 by comparison to the latter examples.

In view of this data, the application of about 20.0 volts to the devices illustrated in examples 1 and 2 actuates blue coloration over a distance of about 20.0 mm within a coloration time of approximately 20.0 minutes. Consequently, the rate of coloration under these circumstances will be about 1.0 mm/minute. In view of the foregoing, the voltage is substantially independent of the distance between the origin of the contacts in examples 1 and 2, which is not the case in examples 3 and 4.

While a preferred embodiment has been described and illustrated it will be clear that various modifications and changes are within the scope of the present invention. The use of various materials for the electrochromic oxide, conductive, and dielectric layers has already been described. Moreover, the orientation of the layers is not limited to the preferred embodiment described herein. Although the preferred coloration action is cathodic in nature, the present invention is just as easily applied to a device displaying anodic coloration. It will be clear to those skilled in the art that higher voltages may be employed with a resulting increase in the rate and length of coloration.

After reference to the foregoing, modifications of this invention may occur to those skilled in the art. However, it is understood that this invention is not intended to be limited to the particular embodiments shown and described herein, but it is intended to cover all modifications coming within the spirit and scope of the invention as disclosed and claimed.

What is claimed is:

1. A solid-state transition metal oxide device comprising a plurality of layers including cathode contact means, anode contact means, means including a layer of dielectric material and means including an electrochromic oxide layer, said means being arranged and oriented such that the application of a predetermined potential to said transition metal oxide device is effective for actuating blue coloration within said electrochromic oxide layer and wherein the coloration action sweeps across the length of said electrochromic oxide layer from said cathode contact means to said anode contact means.

2. A solid-state transition metal oxide device as recited in claim 1, wherein said arrangement and orientation comprise:
   (a) a top layer of conductive material, said top layer comprising said anode contact means;
   (b) said layer of dielectric material affixed to said top layer;
   (c) said layer of electrochromic oxide material secured to said layer of dielectric material;
   (d) said cathode contact means attached to said layer of electrochromic oxide material; and
   (e) a substrate attached to said layers of conductive, dielectric, and electrochromic oxide material and to said cathode contact means.

3. A solid-state transition metal oxide device as recited in claim 1, wherein said arrangement and orientation comprises;
   (a) said layer of dielectric material affixed to said electrochromic oxide layer;
   (b) said cathode contact means secured to said electrochromic oxide layer;
   (c) a substrate affixed to said cathode contact means and to said layer of dielectric material; and
   (d) said anode contact means disposed between said layer of dielectric material and said substrate.

4. A solid-state transition metal oxide device as recited in claim 5, wherein the orientation of said cathode contact relative to said anode contact permits the coloration action to commence at said cathode and sweep laterally within said electrochromic oxide layer toward said anode.

5. A solid-state transition metal oxide device comprising:
   (a) a top layer of conductive material, said top layer comprising an anode contact;
   (b) a layer of dielectric material affixed to said top layer;
   (c) a layer of electrochromic oxide material secured to said layer of dielectric material;
   (d) a cathode contact secured to said layer of electrochromic oxide material; and
   (e) a substrate attached to said layers of conductive, dielectric, and electrochromic oxide material and to said cathode contact;
   whereby the application of a predetermined potential between said contacts actuates coloration within said layer of electrochromic oxide material.

6. A solid-state transition metal oxide device as recited in claim 5, wherein said cathode contact is oriented relative to said anode contact to permit the coloration action to extend from said cathode through said electrochromic oxide layer toward said anode.

7. A solid-state transition metal oxide device as recited in claim 5, wherein said dielectric material comprises $MgF_2$, $SiO$, or $TiO_2$, and the resistivity of said material is at least $1 \times 10^9$ ohm-cm.

8. A solid-state transition metal oxide device as recited in claim 2, wherein the thickness of said dielectric layer is about 1/30 to ½ the thickness of said electrochromic oxide layer.

9. A solid-state transition metal oxide device as recited in claims 1 or 5, wherein said predetermined potential is approximately 20.0 volts.

10. A solid-state transition metal oxide device as recited in claims 1 or 5 wherein the length of coloration within said electrochromic oxide layer is proportional to said predetermined potential applied to said device.

11. A solid-state transition metal oxide device as recited in claims 1 or 5, wherein said electrochromic oxide material comprises $WO_3$, $MoO_3$, $WO_3/MoO_3$, $V_2O_5$, $Nb_2O_5$, $TiO_2$, $W_9Nb_8O_{47}$, $WO_3/ReO_3$, or $WO_3/Au$.

12. A solid-state thin film electrochromic oxide device comprising:

(a) a top layer of Au material, said top layer comprising an anode contact;
(b) a layer of $MgF_2$ material affixed to said Au material;
(c) a layer of $WO_3$ material secured to said layer of $MgF_2$ material;
(d) a cathode contact comprising indium tin oxide material secured to said layer of $WO_3$ material; and
(e) a substrate attached to said Au, $WO_3$, $MgF_2$, and indium tin oxide materials;

whereby the application of a predetermined potential between said anode contact and cathode contact actuates coloration within said layer of $WO_3$ material and wherein the coloration action extend from said cathode to the end of said $WO_3$ layer.

13. A solid-state thin film electrochromic oxide device as recited in claim 12, wherein the orientation of said $WO_3$ layer relative to said anode and cathode contacts is such that the length of coloration within said $WO_3$ layer is proportional to said predetermined potential applied to said device.

* * * * *